US011507993B2

(12) United States Patent
Lu et al.

(10) Patent No.: US 11,507,993 B2
(45) Date of Patent: Nov. 22, 2022

(54) MODIFICATION OF FOOD RECIPES BASED ON GEOGRAPHIC ORIGIN OF PRODUCE

(71) Applicant: INTERNATIONAL BUSINESS MACHINES CORPORATION, Armonk, NY (US)

(72) Inventors: Fang Lu, Billerica, MA (US); Nadiya Kochura, Bolton, MA (US); Janani Janakiraman, Austin, TX (US); Susan Marie Cox, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1013 days.

(21) Appl. No.: 16/204,727

(22) Filed: Nov. 29, 2018

(65) Prior Publication Data

US 2020/0175891 A1 Jun. 4, 2020

(51) Int. Cl.
*G06Q 30/06* (2012.01)
*G06F 16/2457* (2019.01)
*G06F 16/23* (2019.01)
*G09B 19/00* (2006.01)

(52) U.S. Cl.
CPC ....... *G06Q 30/0627* (2013.01); *G06F 16/235* (2019.01); *G06F 16/2457* (2019.01); *G09B 19/0092* (2013.01)

(58) Field of Classification Search
CPC ............... G09B 19/0092; G06F 16/235; G06F 16/2457; G06Q 30/0623; G06Q 30/0627
See application file for complete search history.

(56) References Cited

U.S. PATENT DOCUMENTS

| | | | |
|---|---|---|---|
| 2009/0275002 A1 | 11/2009 | Hoggle | |
| 2012/0317505 A1* | 12/2012 | Schwartz | G06Q 30/0633 715/764 |
| 2014/0324899 A1 | 10/2014 | Sherman et al. | |
| 2015/0079551 A1* | 3/2015 | Egan | G09B 19/0092 434/127 |
| 2016/0235249 A1 | 8/2016 | Patadia | |
| 2016/0335589 A1* | 11/2016 | Knobel | G06F 16/23 |
| 2017/0139902 A1* | 5/2017 | Byron | G06Q 10/087 |
| 2019/0147396 A1* | 5/2019 | Bohling | G06N 5/04 705/28 |

FOREIGN PATENT DOCUMENTS

WO 2016186818 A1 11/2016

* cited by examiner

*Primary Examiner* — Marc S Somers
(74) *Attorney, Agent, or Firm* — Edward J. Wixted, III; Blanche E. Schiller, Esq.; Heslin Rothenberg Farley & Mesiti P.C.

(57) ABSTRACT

Modifying a recipe for food based on a geographic origin of produce in the recipe is disclosed. A recipe is identified by a data processing system for a food dish, produce procured for the recipe from source(s), and determines a geographic origin where the produce was grown and an estimated transport time of the produce from the geographic origin to the source(s). A data processing system analyzes the recipe against ingredient(s) available to the user and aspect(s) of the produce, resulting in analysis result(s), modifies the recipe, resulting in a modified recipe based on the geographic origin, the transport time (may be estimated) and the analysis result(s), and makes available to the user the modified recipe.

20 Claims, 6 Drawing Sheets

MODIFICATION OF FOOD RECIPES BASED ON GEOGRAPHIC ORIGIN OF PRODUCE

BACKGROUND

It has long been known that the climate and weather where produce is grown will affect the flavor of the produce. For example, if the weather is sunny almost all of the time where the fruit is grown, the fruit will be sweeter relative to a region with less sun, due to increased sugar content. As another example, if some vegetables are grown in a region experiencing an extended temperature increase, the flavor suffers.

SUMMARY

Shortcomings of the prior art are overcome and additional advantages are provided through the provision, in one aspect, of a computer-implemented method of modifying a recipe for food based on a geographic origin of produce in the recipe. The method includes: identifying, by a data processing system, a recipe for a food dish to be prepared by a user; identifying, by the data processing system, produce procured for the recipe; determining, by the data processing system, a geographic origin of the produce and a transport time of the produce from the geographic origin to one or more source from which the produce was procured; analyzing the recipe, by a data processing system, against at least one ingredient available to the user and one or more aspect of the produce, resulting in at least one analysis result; modifying the recipe, by the data processing system, resulting in a modified recipe based on the geographic origin, the transport time and the at least one analysis result; and making available to the user, by the data processing system, the modified recipe for making, by the user, the food dish.

In another aspect, a system for modifying a recipe for food based on a geographic origin of produce in the recipe may be provided. The system may include, for example, memory(ies), at least one processor in communication with the memory(ies). Further, the system may include program instructions executable by the one or more processor via the memory to perform a method. The method may include, for example: identifying, by a data processing system, a recipe for a food dish to be prepared by a user; identifying, by the data processing system, produce procured for the recipe; determining, by the data processing system, a geographic origin of the produce and a transport time of the produce from the geographic origin to one or more source from which the produce was procured; analyzing the recipe, by a data processing system, against at least one ingredient available to the user and one or more aspect of the produce, resulting in at least one analysis result; modifying the recipe, by the data processing system, resulting in a modified recipe based on the geographic origin, the transport time and the at least one analysis result; and making available to the user, by the data processing system, the modified recipe for making, by the user, the food dish.

In a further aspect, a computer program product may be provided. The computer program product may include a storage medium readable by a processor and storing instructions executable by the processor for performing a method of modifying a recipe for food based on a geographic origin of produce in the recipe. The method may include, for example: identifying, by a data processing system, a recipe for a food dish to be prepared by a user; identifying, by the data processing system, produce procured for the recipe; determining, by the data processing system, a geographic origin of the produce and a transport time of the produce from the geographic origin to one or more source from which the produce was procured; analyzing the recipe, by a data processing system, against at least one ingredient available to the user and one or more aspect of the produce, resulting in at least one analysis result; modifying the recipe, by the data processing system, resulting in a modified recipe based on the geographic origin, the transport time and the at least one analysis result; and making available to the user, by the data processing system, the modified recipe for making, by the user, the food dish.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
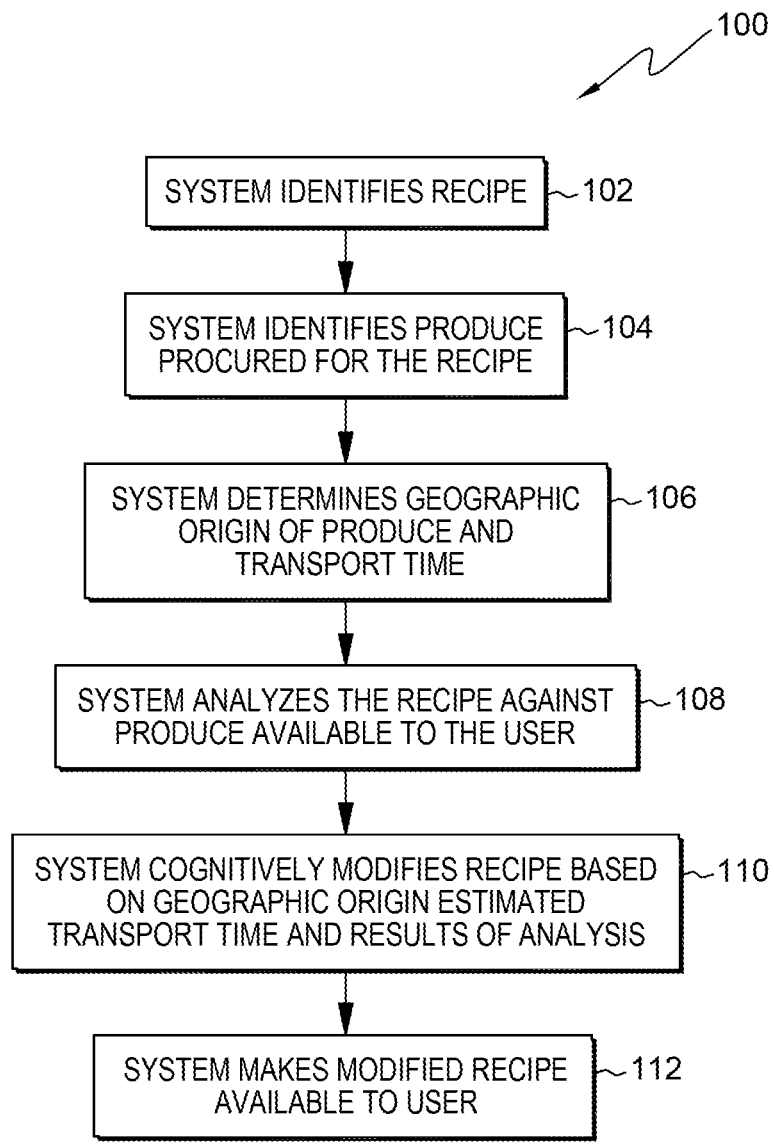
FIG. 1 is a flow diagram for one example of a computer-implemented method of modifying a recipe for food based on the geographic origin of produce in the recipe, in accordance with one or more aspects of the present disclosure.

One or more aspects of this disclosure relate, in general, to modification of food recipes. More particularly, one or more aspects of this disclosure relate to cognitive modification of food recipes calling for produce, based on the geographic origin of the produce.

As used herein, the term "recipe" refers to a recipe for food that calls for one or more type of produce.

As used herein, the term "produce" refers to food that is grown, for example, fruits, vegetables, roots, grains, nuts, legumes, soy etc.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

FIG. 1 is a flow diagram 100 for one example of a computer-implemented method of modifying a recipe for food based on a geographic origin of produce in the recipe. The computer-implemented method includes, for example, the system identifying 102 a recipe. In one example, the recipe is provided to the system by the user. In another example, the system obtains the recipe with or without user input. The system then identifies 104 produce procured for the recipe. In one example, the system identifies the produce, at least in part, via a bar code. In another example, the system uses other information available regarding the produce to identify the produce. The system then determines 106 a geographic origin of the produce and a transport time for the produce from the origin to a venue (e.g., a grocery store or other market) where the produce is procured for the recipe. In one example, the system obtains the actual transport time if available. In another example, the system estimates the transport time. In still another example, the system can also calculate the transit time based on the identified geographic origin, location of source from which the produce was procured, and date of purchase.

In addition, the method may include, for example, the data processing system mining data related to the recipe. In one example, the data mined may be related to an author of the recipe. For example, if a specific type of produce is missing from the recipe, e.g., recipe just has "apples" with no particular variety, the data processing system may use the information related to the author to cognitively predict a specific type of produce the author would use. A data processing system then analyzes 108 the recipe against ingredient(s) available to the user and one or more aspect of the produce. The data processing system then cognitively modifies 110 the recipe, based on the geographic origin, the estimated transport time and the results of the analysis. The data processing system then makes 112 the modified recipe available to the user for the user to make the food dish.

Analyzing the recipe can include, for example, the data processing system retrieving information regarding a type of the produce and/or the data processing system retrieving information regarding any specific type of produce in the recipe and/or the data processing system retrieving information regarding one or more characteristic of the produce. The characteristic(s) can include, for example, whether the produce is in season and/or whether the produce was ripened naturally and/or whether the produce was genetically modified and/or whether the produce is organic.

In one embodiment, information regarding a number of different types of produce is stored in a database, the different types including the produce of interest, and modifying includes updating the database with the estimated transport time.

In one embodiment, the modified recipe may include, for example, a different amount of the produce than the recipe and/or a different amount of time for at least one step of the recipe and/or adding at least one ingredient to the recipe for taste enhancement. In another embodiment, machine learning may be used for the data processing system, based on data regarding a number of different types of produce and recipes to improve modifying the recipe.

Figure 2:
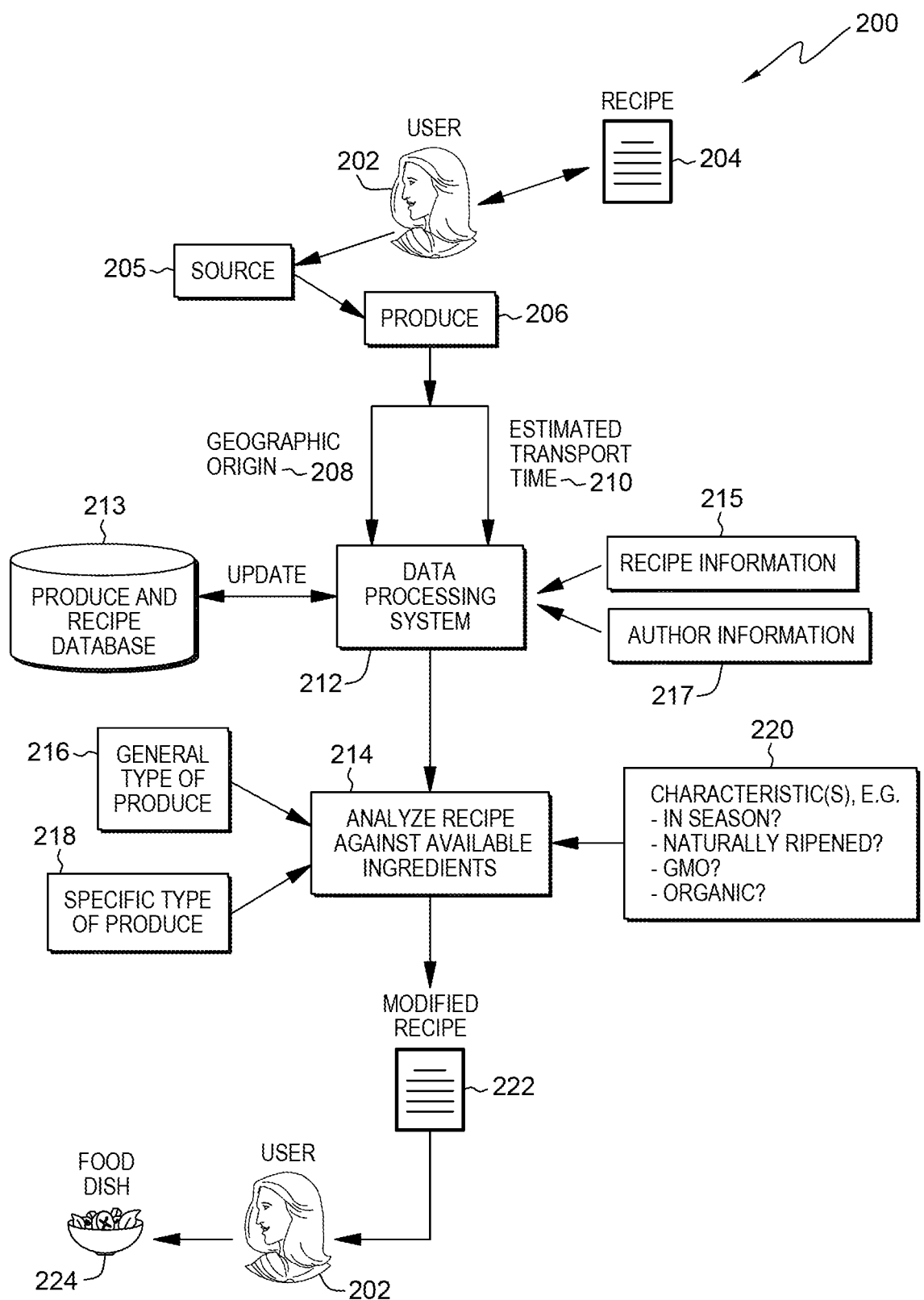
FIG. 2 is a modified flow diagram for a more visual representation of various embodiments disclosed herein, in accordance with one or more aspects of the present disclosure.

FIG. 2 is a hybrid block/flow diagram 200 of one example of a visual representation of various embodiments of modifying a food recipe based on a geographic origin of produce called for in the recipe. A user 202 obtains a recipe 204 for a food dish that calls for produce. The user then procures the produce from one or more source 205. The user then determines 208 a geographic origin where the produce was grown and an estimated transport time 210 (or actual, if available) from the geographic origin to the one or more source of the procured produce. The transport may include, for example, ground transport, air transport, transport by sea, drone transport, etc., or any combination thereof. The geographic origin and estimated transport time are then passed to data processing system 212. In one embodiment, there may be a database 213 of recipe and/or produce data. The data processing system may, for example, update the database with various information, for example, the type of produce, the geographic origin thereof and/or the estimated transport time. The data processing system may also obtain, for example, other information 215 regarding the recipe and/or information regarding an author 217 of the recipe (e.g., other recipes, writings, commentary, etc. produced by the author). The data processing system analyzes 214 the recipe against ingredients available to the user. Additional information regarding the recipe may also be used in the analysis, for example, information regarding a general type of produce 216 (e.g., a tomato), information regarding a specific type of produce in the recipe 218 (e.g., a beefsteak tomato) and/or one or more characteristic 220 of the produce. The characteristics may include, for example, whether the produce in in season, whether the produce was naturally ripened, whether the produce has been genetically modified (which may alter aspects of the produce) and/or whether the produce is organic. Relatedly, for example, what type(s) of pest repellants may be used while growing the produce may be known. As another example, regional weather experienced during the growth of the produce may be known or obtained. For example, regional weather near the time of harvest may be known or obtained. With prolonged overcast conditions, especially near the harvest, there is reduced sugar and soluble carbohydrates in the produce so that the actual taste of the fruit and vegetables ("produce," generally) will also change as you reduce the balance of sugars and starch and other nutrients present. The nutrients available to the plant might well be reduced under certain growing conditions. Rainfall, for example, will often cause leaching and loss of nutrients from the soil, and at certain times that will certainly reduce the amount of nutrients that end up in the harvested produce. The output of all this is a modified recipe 222 based on the geographic origin of the produce, the estimated transport time and the results of the analysis. The modified recipe is then made available 224 to the user, for example, for preparation of the food dish.

Modification criteria for the recipe can include, for example, one or more of reduced preparation time, improved quality, ingredient availability, reduced cost, increased rating, higher nutrition, better taste and the novelty of the recipe, to name a few.

In one example, a user may choose a recipe for apple pie, using, for example, the "transparent" variety of apples. The apples used will have different tartness and sweetness, depending on the geography, transportation time and growing conditions/climate, as well as recent weather data prior to harvest. In addition to flavor, the noted factors will also affect, for example, physical aspects of the apples, e.g., the size and firmness of the apple. For example, the same variety of apple grown in Washington State and New York State will have a different taste, e.g., in terms of sweetness and tartness. Similarly, if the user is located in California, the transportation time from Washington State will be significantly less than New York State. In addition, since the New York State apples will have a longer transport time, they may be picked sooner than the apples from Washington State, affecting their ripeness.

In one example, reducing preparation time may include assisting a user to choose an item of produce from a number obtained at different venues, based, in part, on the origin of the produce. Improving food quality can include, for example, determining from items of a same type of produce from different sources, whether each item was in season at the origin when harvested. In one example, improving the food dish may include substituting a different type of tomato, which improves the taste, than set forth in the recipe. Reducing cost can include, for example, substituting less costly local produce than specified in the recipe. In one example, an increased rating (e.g., on a social food network) may be achieved where the system finds information regarding improving a presentation of the food dish. Improving nutrition can include, for example, substituting produce for meat in the recipe. In one example, improving the taste of the food dish may include adding spices to the recipe. A novelty of a recipe may be improved by, for example, adding unexpected produce not called for in the recipe, but which nonetheless compliments the food dish.

Certain embodiments herein may offer various technical computing advantages involving computing advantages to address problems arising in the realm of computer networks. Particularly, computer networks operating to provide a cognitively modified recipe for a food dish based on the geographic origin of produce and a transport time for the produce, which may be estimated. Embodiments herein utilize machine learning using produce and recipe data, as well as historical recipe modifications, to improve the cognitive modification of recipes. Embodiments herein provide a cognitive prediction of a specific type of produce the author(s) of the recipe would choose, based on information obtained about the author. Embodiments herein take into account one or more characteristics of the produce in the recipe, including, for example, whether the produce is in season and/or whether the produce was ripened naturally and/or whether the produce was genetically modified and/or whether the produce is organic. Various decision data structures can be used to drive artificial intelligence (AI) decision making, such as a decision data structure that cognitively modifies a recipe for a food dish based on where the produce was grown, as well as other factors and/or that cognitively predicts, for a given recipe, a specific type of produce the author(s) of the recipe would use.

Decision data structures as set forth herein can be updated by machine learning so that accuracy and reliability is iteratively improved over time without resource consuming rules intensive processing. Machine learning processes can be performed for increased accuracy and for reduction of reliance on rules-based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, processing for transforming unstructured data into a form optimized for computerized processing. Embodiments herein can examine data from diverse data sources such as one or more sources that process radio signals for location determination of users. Embodiments herein can include artificial intelligence processing platforms featuring improved processes to transform unstructured data into structured form permitting computer-based analytics and decision making. Embodiments herein can include particular arrangements for both collecting rich data into a data repository and additional particular arrangements for updating such data and for use of that data to drive artificial intelligence decision making.

In cases where text needs to be interpreted, for example, in a recipe found online, Natural Language Understanding (NLU) may be used to better understand the text of the recipe, for example, explanations of steps to take in preparation of the food dish resulting from the recipe. In another example, writings by and/or about the author may be analyzed using NLU, in order to predict what produce the recipe's author would choose in the case where the produce in the recipe is not available. The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real-world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing. In the present case, the lexicon can include, for example, words and phrases related to produce, for example, types and varieties of produce, as well as descriptive language for particular produce.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated, for example, "cooked" and "cooking" in close proximity. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages. Such a NLU classifier can be set up for produce.

For example, consider the following questions: "Is the produce soft or hard?," "What does a color change in the produce mean?" or "Where was the produce grown?" NLC can determine that they are all ways of asking how to determine if the produce is ripe. Short phrases can be found in online discussion forums, emails, social media feeds, SMS messages, and electronic forms. Using, for example, an API (Application Programming Interface) for a NLU service, one can send text from these sources to a natural language classifier trained using machine learning techniques. The classifier will return its prediction of a class that best captures what is being expressed in that text. Based on the predicted class one can trigger an application to take the appropriate action such as providing an answer to a question, suggest a relevant product based on expressed interest or forward the text to an appropriate human expert who can help with a recipe.

Applications of such APIs include, for example, classifying a recipe as including or not including produce based on the body of the recipe; creating question and answer (Q&A) applications for the produce industry; classifying news content following some specific classification such as business, entertainment, politics, sports, and so on (e.g., classifying news as food or produce related); categorizing volumes of written content regarding growing produce harvesting and cooking with produce; categorizing music albums following some criteria such as genre, singer, and so on; combining a Natural Language Classifier service with a Conversation service if one wants their application to engage in a conversation with a user; and classifying frequently asked questions (FAQs).

In one example, a cognitive computer system performs one or more functions herein, for example, modifying a recipe for food. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI—Adaptive User Interface) to adjust content for a particular type of audience. As such, CC hardware and applications strive to be more effective and more influential by design.

Some common features that cognitive systems may express include, for example: ADAPTIVE—they may learn as information changes (e.g., transition in growing seasons for produce), and as goals and requirements evolve. They may resolve ambiguity and tolerate unpredictability. They may be engineered to feed on dynamic data in real time (e.g., weather related information), or near real time; INTERACTIVE—they may interact easily with users so that those users can define their needs comfortably. They may also interact with other processors, devices, and Cloud services, as well as with people; ITERATIVE AND STATEFUL—they may aid in clarifying a recipe by asking questions or finding additional input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location (e.g., location of growth and harvesting), appropriate domain, regulations, user's profile, process, task and goal. They may draw on multiple sources of information, including both structured and unstructured digital information, as well as sensory inputs (e.g., visual, gestural, auditory and/or sensor-provided).

Figure 3:
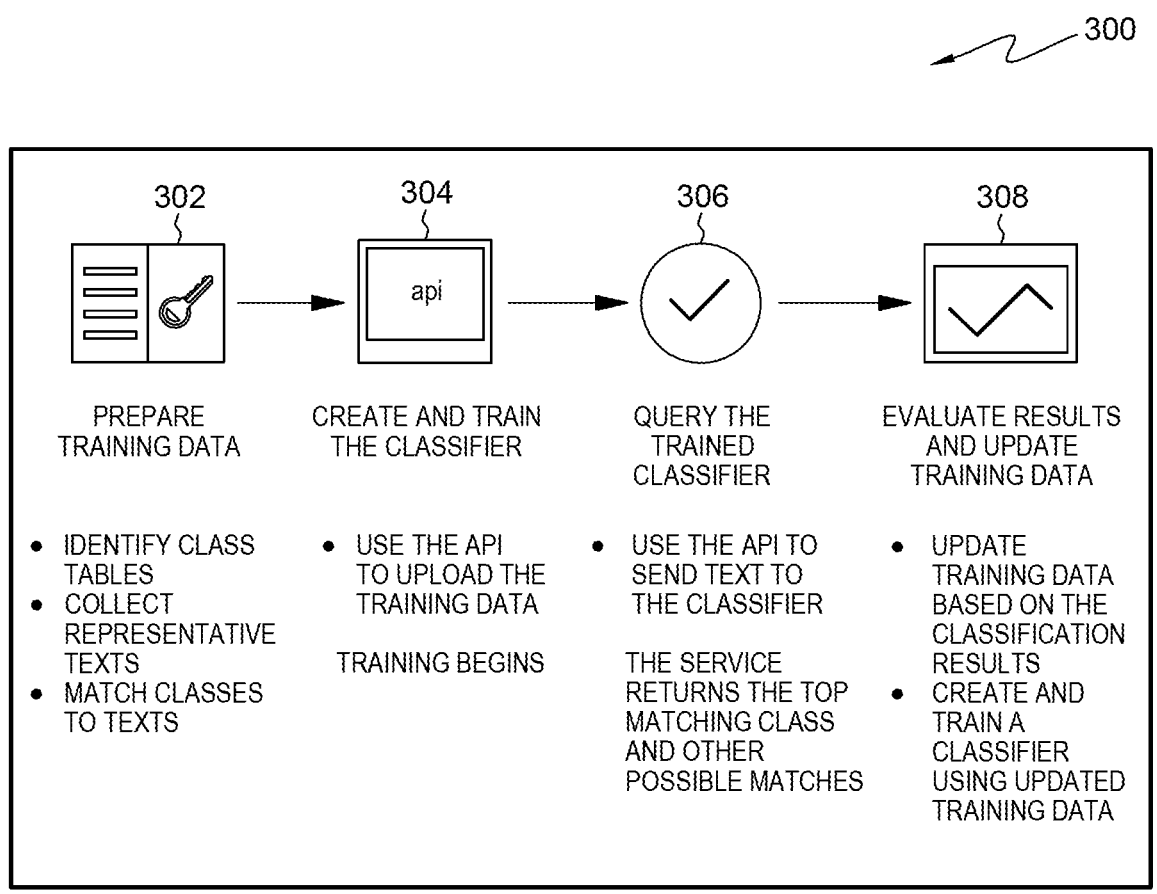
FIG. 3 is a hybrid flow diagram of one example of an overview of the basic steps for creating and using a natural language classifier service, in accordance with one or more aspects of the present disclosure.

FIG. 3 is a hybrid flow diagram 300 of one example of an overview of the basic steps for creating and using a natural language classifier service. Initially, training data for machine learning is prepared, 302, by identifying class tables (e.g., types of produce), collecting representative texts (e.g., collecting recipes) and matching the classes to the representative texts (e.g., matching produce and recipes). An API (Application Planning Interface) may then be used to create and train the classifier 304 by, for example, using the API to upload training data. Training may begin at this point. After training, queries can be made to the trained natural language classifier, 306. For example, the API may be used to send text to the classifier. The classifier service then returns the matching class, along with other possible matches. The results may then be evaluated, and the training data updated, 308, for example, by updating the training data based on the classification results. Another classifier can then be trained using the updated training data.

Various decision data structures can be used to drive artificial intelligence (AI) decision making, such as a decision data structure to predict produce an author of a recipe would use. Decision data structures as set forth herein can be updated by machine learning so that accuracy and reliability is iteratively improved over time without resource consuming rules intensive processing. Machine learning processes can be performed for increased accuracy and for reduction of reliance on rules-based criteria and thus reduced computational overhead. For enhancement of computational accuracies, embodiments can feature computational platforms existing only in the realm of computer networks such as artificial intelligence platforms, and machine learning platforms.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as one or more sources that process weather-related signals (e.g., radar). Embodiments herein can include artificial intelligence processing platforms featuring improved processes to transform unstructured data into structured form permitting computer-based analytics and decision making. Embodiments herein can include particular arrangements for both collecting rich data into a data repository and additional particular arrangements for updating such data and for use of that data to drive artificial intelligence decision making.

Where used herein, the term "cognitive modifying" refers to the use of cognitive computing in modifying a recipe for food based on a geographic origin of produce in the recipe. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

Where used herein, the term "real-time" refers to a period of time necessary for data processing and presentation to a user to take place, and which is fast enough that a user does not perceive any significant delay. Thus, "real-time" is from the perspective of the user.

The system herein can run various processes including, for example, those for preparation and maintenance processes, Natural Language Understanding (NLU) processes, predicting processes, notifying processes and machine learning processes.

A predicting process may employ, for example, a predictive model trained using machine learning to predict what type of produce an author of the recipe would use based on researching the author. Such a predictive model, once trained by machine learning, can be configured to respond to query data. The predictive model can respond to query data to return data, indicating, for example, a specific type of produce the author(s) of the recipe would use. In one example, the predictive model may take the form of a classification predictive model. Various available tools, libraries, and/or services can be utilized for implementation of the predictive model. For example, a machine learning service may be used. A machine learning service can, for example, provide access set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models.

In one example, the system herein can run a machine learning process that can update one or more processes based on obtained data to improve accuracy and/or reliability of the one or more processes. In one embodiment, the system may, for example, use a decision data structure that predicts, in accordance with a predicting process for what one or more authors of a recipe, for example, would choose for a type or variety of produce. Such a decision data structure may use available data about the author, for example, other recipes of the author, biographical information about the author or even anecdotal information about the author, as well as talks or interviews given by the author.

The system in one embodiment can run a plurality of instances of such a decision data structure, each instance for a different recipe. For each instance of the decision data structure, the system can change one or more variables. The system running such a machine learning process can continually or periodically update the variables of the different instances of the decision data structure.

The system can run a NLU process to process data for preparation of records that are stored in a data repository or database and for other purposes. The system can run a Natural Language Understanding (NLU) process for determining one or more NLU output parameters of text, for example, text in a recipe or article about or involving produce. As another example, information related to the author(s) of recipes may be appropriate for a NLU process. The NLU process can include one or more of a topic classification process that determines topics of messages and output one or more topic NLU output parameters, a sentiment analysis process which determines polar NLU output parameters relating to produce, for example, "ripe," "not ripe" or other classification process for output of one or more other NLU output parameters, e.g., one or more "social" NLP output parameters regarding produce, for example, on food-based social media or one or more "writing style" NLU output parameters for articles by recipe authors.

By running such a NLU process, the system can perform a number of processes including one or more of (a) topic classification and output of one or more topic NLU output parameters for various information about a recipe author(s), for example, (b) sentiment classification and output of one or more sentiment NLU output parameter for such information or (c) other NLU classifications and output of one or more other NLU output parameter for information obtained.

Topic analysis for topic classification and output of NLU output parameters can include topic segmentation to identify several topics within a message. Topic analysis can apply a variety of technologies e.g., one or more of Hidden Markov models (HMM), artificial chains, passage similarities using word co-occurrence, topic modeling, or clustering. Sentiment analysis for sentiment classification and output of one or more sentiment NLU parameters can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Disclosed herein is, for example, a method to enhance the quality of the dishes by updating the recipes based on the "origin" of the fresh produce being used. The method includes gathering data about the fresh produce by scanning the barcode of the fresh produce, estimating the time the produce was in transport mode and the geographic origin. The method further includes mining data about the recipe to gather information about the author of recipe, which may provide additional information about the potential geographic origin of the ingredients referred to in the recipe, and analyzing the available ingredients and the recipe by looking up information in a database about the characteristics of the fresh produce (e.g., is it in season, was it ripened naturally, etc.) and looking up information in a recipe about any specific mention of types of fresh produce. The method further includes modifying the recipe by: changing the quantity of the fresh produce to use (e.g., one teaspoon of sugar instead of three teaspoons, because the system determines that the tomato was grown such that it will be sweeter); and/or specifying the time needed for various steps in the recipe (e.g., certain types of potatoes might require longer different cooking times), and presenting the modified recipe to the user along with an optional updated list of ingredients to gather. The method may also consider the weather and environmental factors regarding the location from which the produce originates, and detect and apply correlations between the weather conditions and the produce quality with an impact on taste and recipes.

In a first aspect, disclosed above is a computer-implemented method for modifying a recipe for food based on a geographic origin of produce in the recipe. The computer-implemented method includes identifying, by a data processing system, a recipe for a food dish to be prepared by a user; identifying, by the data processing system, produce procured for the recipe; determining, by the data processing system, a geographic origin of the produce and a transport time of the produce from the geographic origin to source(s) from which the produce was procured; analyzing the recipe, by the data processing system, against at least one ingredient available to the user and aspect(s) of the produce, resulting in analysis result(s); modifying the recipe, by the data processing system, resulting in a modified recipe based on the geographic origin, the transport time and the analysis result(s); and making available to the user, by the data processing system, the modified recipe.

In one example, the geographic origin of the produce may be, for example, determined based, at least in part, on information received by the data processing system from a bar code for the produce.

In one example, the computer-implemented method of the first aspect may further include, for example, obtaining, by the data processing system, information related to the recipe. In one example, obtaining information related to the recipe may include, for example, obtaining information, by the data processing system, related to an author of the recipe. In one example, a specific type of produce may be, for example, missing from the recipe, the method may further include, for example, using, by the data processing system, the information related to the author to cognitively predict a specific type of produce the author would use.

In one example, the analyzing in the computer-implemented method of the first aspect may include, for example, one or more of retrieving information, by the data processing system, regarding a type of the produce, retrieving information, by the data processing system, regarding any specific type of produce in the recipe and retrieving information, by the data processing system, regarding characteristic(s) of the produce. In one example, the characteristic(s) may include, for example, at least one of whether the produce is in season, whether the produce was ripened naturally, whether the produce was genetically modified and whether the produce is organic.

In one example, information regarding produce in the computer-implemented method of the first aspect may be, for example, stored in a database, the produce including the produce in the recipe, and the modifying includes updating the database with the estimated transport time.

In one example, the modified recipe in the computer-implemented method of the first aspect may include, for example, one or more of a different amount of the produce than the recipe, a different amount of time for step(s) of the recipe and adding ingredient(s) to the recipe for taste enhancement.

In one example, the computer-implemented method of the first aspect may further include, for example, using machine learning for the data processing system based on data regarding produce and a recipe to improve the modifying.

In a second aspect, disclosed above is a system for modifying a recipe for food based on a geographic origin of produce in the recipe. The system includes a memory; and processor(s) in communication with the memory, the memory storing program code executable by the processor(s) to perform a method. The method includes: identifying, by a data processing system, a recipe for a food dish to be prepared by a user; identifying, by the data processing system, produce procured for the recipe; determining, by the data processing system, a geographic origin of the produce and a transport time of the produce from the geographic origin to source(s) from which the produce was procured; analyzing the recipe, by a data processing system, against at least one ingredient available to the user and aspect(s) of the produce, resulting in analysis result(s); modifying the recipe, by the data processing system, resulting in a modified recipe based on the geographic origin, the transport time and the analysis result(s); and making available to the user, by the data processing system, the modified recipe.

In one example, the method may further include, for example, obtaining, by the data processing system, information related to the recipe, obtaining information related to the recipe includes obtaining information, by the data processing system, related to an author of the recipe, and a specific type of produce may be, for example, missing from the recipe, the method may further include, for example, using, by the data processing system, the information related to the author to cognitively predict a specific type of produce the author would use.

In one example, the analyzing in the method in the system of the second aspect may include, for one or more of retrieving information, by the data processing system, regarding a type of the produce, retrieving information, by the data processing system, regarding any specific type of produce in the recipe and retrieving information, by the data processing system, regarding characteristic(s) of the produce, and the characteristic(s) may include, for example, at least one of whether the produce is in season, whether the produce was ripened naturally, whether the produce was genetically modified and whether the produce is organic.

In one example, the modified recipe in the method in the system of the second aspect may include, for example, one or more of a different amount of the produce than the recipe, a different amount of time for step(s) of the recipe and adding ingredient(s) to the recipe for taste enhancement.

In one example, the method in the system of the second aspect may further include, for example, using machine learning for the data processing system based on data regarding produce and a recipe to improve the modifying.

In a third aspect, disclosed above is a computer program product for modifying a recipe for food based on a geographic origin of produce in the recipe. The computer program product includes a storage medium readable by a processor and storing instructions executable by the processor for performing a method. The method includes identifying, by a data processing system, a recipe for a food dish to be prepared by a user; identifying, by the data processing system, produce procured for the recipe; determining, by the data processing system, a geographic origin of the produce and a transport time of the produce from the geographic origin to source(s) from which the produce was procured; analyzing the recipe, by the data processing system, against at least one ingredient available to the user and aspect(s) of the produce, resulting in analysis result(s); modifying the recipe, by the data processing system, resulting in a modified recipe based on the geographic origin, the transport time and the analysis result(s); and making available to the user, by the data processing system, the modified recipe.

In one example, the method of the computer program product of the third aspect may further include, for example, obtaining, by the data processing system, information related to the recipe, obtaining information related to the recipe includes obtaining information, by the data processing system, related to an author of the recipe, and a specific type of produce may be, for example, missing from the recipe, the method may further include, for example, using, by the data processing system, the information related to the author to cognitively predict a specific type of produce the author would use.

In one example, the analyzing in the method of the computer program product of the third aspect may include, for one or more of retrieving information, by the data processing system, regarding a type of the produce, retrieving information, by the data processing system, regarding any specific type of produce in the recipe and retrieving information, by the data processing system, regarding characteristic(s) of the produce, and the characteristic(s) may include, for example, at least one of whether the produce is in season, whether the produce was ripened naturally, whether the produce was genetically modified and whether the produce is organic.

In one example, the modified recipe in the computer program product of the third aspect may include, for example, one or more of a different amount of the produce than the recipe, a different amount of time for step(s) of the recipe and adding ingredient(s) to the recipe for taste enhancement.

In one example, the method of the computer program product of the third aspect may further include, for example, using machine learning for the data processing system based on data regarding produce and a recipe to improve the modifying.

Figure 4:
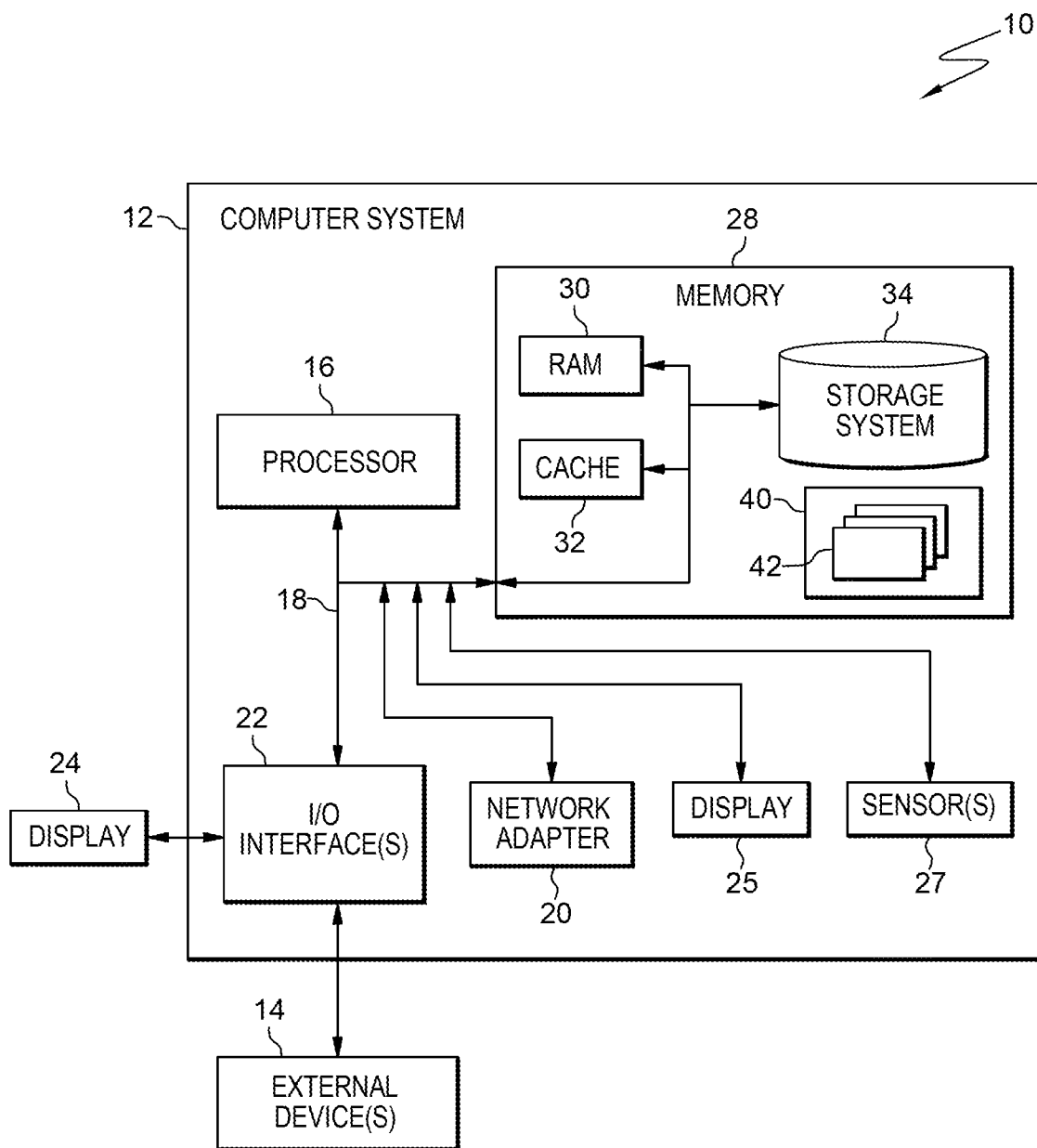
FIG. 4 is a block diagram of one example of a computer system, in accordance with one or more aspects of the present disclosure.
Figure 5:
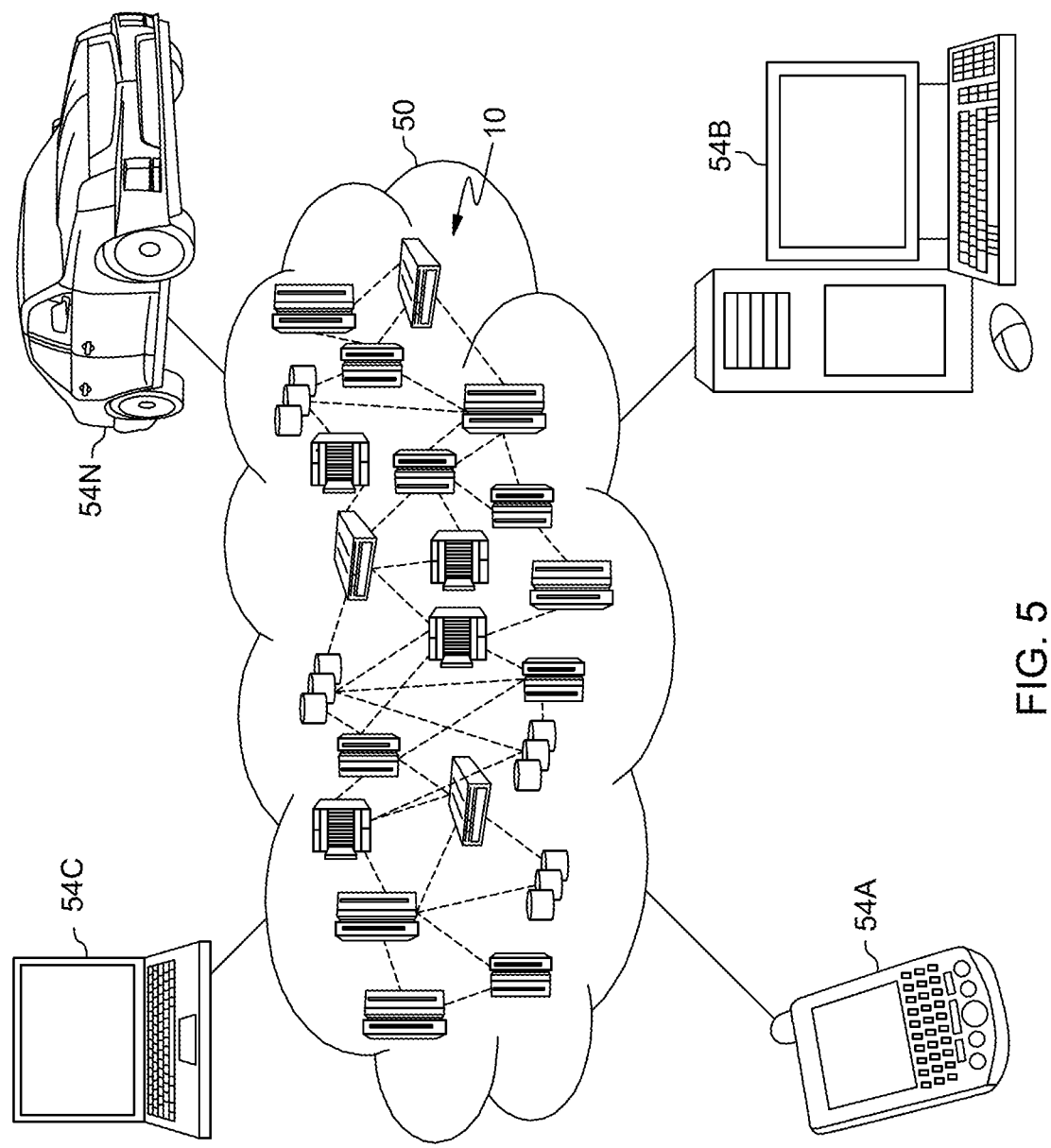
FIG. 5 is a block diagram of one example of a cloud computing environment, in accordance with one or more aspects of the present disclosure.
Figure 6:
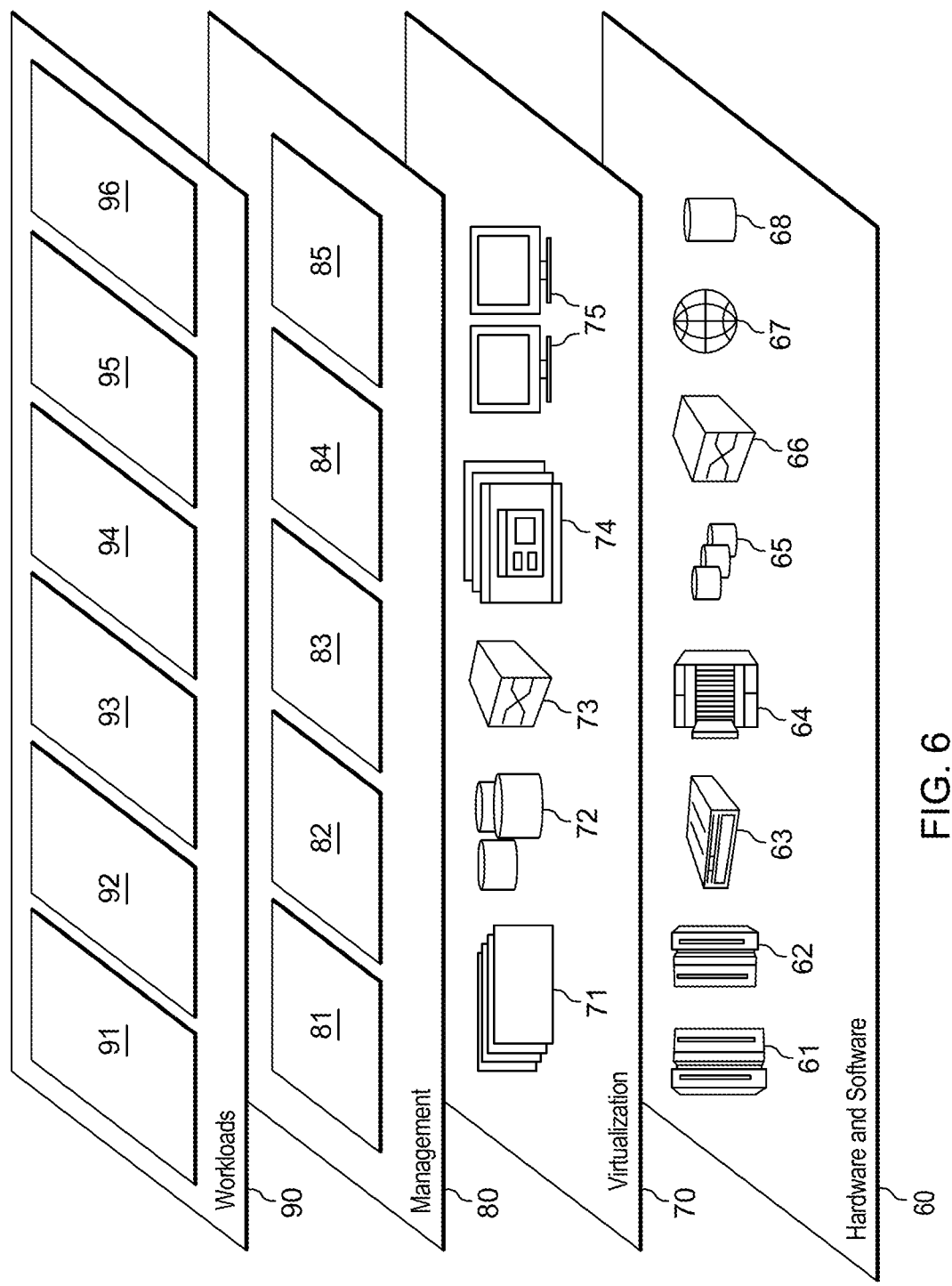
FIG. 6 is a block diagram of one example of functional abstraction layers of the cloud computing environment of FIG. 5, in accordance with one or more aspects of the present disclosure.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment: or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in computing node 10 is shown in the form of a computing device. The components of computer system 12 may include, but are not limited to, one or more processors 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 5-6.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more programs 40, having a set (at least one) of program processes 42, may be stored in memory 28 by way of example, and not limitation, as well as an operating system, one or more application programs, other program processes, and program data. One or more programs 40 including program processes 42 can generally carry out the functions set forth herein. One or more programs 40 including program processes 42 can define machine logic to carry out the functions set forth herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor devices 27 connected to bus 18. One or more sensor devices 27 can alternatively be connected through I/O interface(s) 22. One or more sensor devices 27 can include a Global Positioning Sensor (GPS) device in one embodiment and can be configured to provide a location of computing node 10. In one embodiment, one or more sensor devices 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapters 20. In FIG. 5 computing node 10 is described as being implemented in a cloud computing environment and accordingly is referred to as a cloud computing node in the context of FIG. 5.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more programs 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements but is not limited to possessing only those one or more steps or elements. Likewise, a step of a method or an element of a device that "comprises," "has," "includes," or "contains" one or more features possesses those one or more features but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of modifying a recipe for food based on a geographic origin of produce in the recipe, the computer-implemented method comprising:

identifying, by a data processing system, a recipe for a food dish to be prepared by a user, wherein a type indication for at least one type of produce is missing from the recipe;

identifying, by the data processing system, produce procured for the recipe;

receiving, by the data processing system, at least one query as to what type of produce the author would use with the recipe for the at least one type of produce;

based on receiving the at least one query, instantiating, by the data processing system, an instance of a decision data structure for a predictive model trained using machine learning and configured to respond to the at least one query, the instance of the decision data structure being for the recipe;

predicting, by the data processing system, using the instance of the decision data structure, the at least one type of produce the author would use with the recipe;

determining, by the data processing system, a geographic origin of the produce and a transport time of the produce from the geographic origin to one or more sources from which the produce was procured;

analyzing the recipe, by the data processing system, against at least one ingredient available to the user, the at least one type of produce predicted for use by the author and one or more aspects of the produce, resulting in at least one analysis result;

modifying the recipe, by the data processing system, resulting in a modified recipe based on the geographic origin, the transport time and the at least one analysis result;

making available to the user, by the data processing system, the modified recipe;

monitoring, by the data processing system, the modified recipe to determine one or more modifications to the modified recipe; and updating, using machine learning, the instance of the decision data structure based on the monitoring, wherein the monitoring and updating are performed, at least, periodically to provide an iteratively improved instance of the decision data structure to be used in, at least, the pretending the at least one type of produce to improve the modifying the recipe.

2. The computer-implemented method of claim 1, wherein the geographic origin of the produce is determined based, at least in part, on information received by the data processing system from a bar code for the produce.

3. The computer-implemented method of claim 1, further comprising obtaining information, by the data processing system, related to an author of the recipe for use in the predicting.

4. The computer-implemented method of claim 1, wherein the instantiating comprises instantiating a unique instance of the decision data structure for each recipe.

5. The computer-implemented method of claim 1, wherein the analyzing comprises one or more of retrieving information, by the data processing system, regarding a type of the produce, retrieving information, by the data processing system, regarding any specific type of produce in the recipe and retrieving information, by the data processing system, regarding one or more characteristics of the produce.

6. The computer-implemented method of claim 5, wherein the one or more characteristics comprises at least one of whether the produce is in season, whether the produce was ripened naturally, whether the produce was genetically modified and whether the produce is organic.

7. The computer-implemented method of claim 1, wherein information regarding a plurality of produce is stored in a database, wherein the plurality of produce comprises the produce in the recipe, and wherein the modifying comprises updating the database with the estimated transport time.

8. The computer-implemented method of claim 1, wherein the modified recipe comprises one or more of a different amount of the produce than the recipe, a different amount of time for at least one step of the recipe and adding at least one ingredient to the recipe.

9. The computer-implemented method of claim 1, further comprising using machine learning for the data processing system based on data regarding a plurality of produce and a plurality of recipes.

10. The computer-implemented method of claim 1, wherein the predicting comprises using Natural Language Understanding to understand text of one or more items of information by or about the author used in performing the predicting.

11. A system for modifying a recipe for food based on a geographic origin of produce in the recipe, the system comprising:
a memory; and
at least one processor in communication with the memory, the memory storing program code executable by the at least one processor to perform a method, the method comprising:
identifying, by a data processing system, a recipe for a food dish to be prepared by a user, wherein a type indication for at least one type of produce is missing from the recipe;
identifying, by the data processing system, produce procured for the recipe;
receiving, by the data processing system, at least one query as to what specific type of produce the author would use with the recipe for the at least one type of produce;
based on receiving the at least one query, instantiating, by the data processing system, an instance of a decision data structure for a predictive model trained using machine learning and configured to respond to the at least one query, the instance of the decision data structure being for the recipe;
predicting, by the data processing system, using the instance of the decision data structure, the at least one type of produce the author would use with the recipe;
determining, by the data processing system, a geographic origin of the produce and a transport time of the produce from the geographic origin to one or more sources from which the produce was procured;
analyzing the recipe, by the data processing system, against at least one ingredient available to the user, the at least one type of produce predicted for use by the author and one or more aspects of the produce, resulting in at least one analysis result;
modifying the recipe, by the data processing system, resulting in a modified recipe based on the geographic origin, the transport time and the at least one analysis result;
making available to the user, by the data processing system, the modified recipe;
monitoring, by the data processing system, the modified recipe to determine one or more modifications to the modified recipe; and
updating, using machine learning, the instance of the decision data structure based on the monitoring, wherein the monitoring and updating are performed, at least, periodically to provide an iteratively improved instance of the decision data structure to be used in, at least, the predicting the at least one type of produce to improve the modifying the recipe.

12. The system of claim 11, wherein the instantiating comprises instantiating a unique instance of the decision data structure for each recipe.

13. The system of claim 11, wherein the analyzing comprises one or more of retrieving information, by the data processing system, regarding a type of the produce, retrieving information, by the data processing system, regarding any specific type of produce in the recipe and retrieving information, by the data processing system, regarding one or more characteristics of the produce, and wherein the one or more characteristics comprises at least one of whether the produce is in season, whether the produce was ripened naturally, whether the produce was genetically modified and whether the produce is organic.

14. The system of claim 11, wherein the modified recipe comprises one or more of a different amount of the produce than the recipe, a different amount of time for at least one step of the recipe and adding at least one ingredient to the recipe.

15. The system of claim 11, further comprising using machine learning for the data processing system based on data regarding a plurality of produce and a plurality of recipes.

16. A computer program product for modifying a recipe for food based on a geographic origin of produce in the recipe, the computer program product comprising:
a computer readable storage medium readable by a processor and storing instructions executable by the processor for performing a method, the method comprising:
identifying, by a data processing system, a recipe for a food dish to be prepared by a user, wherein a type indication for at least one type of produce is missing from the recipe;
identifying, by the data processing system, produce procured for the recipe;
receiving, by the data processing system, at least one query as to what specific type of produce the author would use with the recipe;
based on receiving the at least one query, instantiating, by the data processing system, an instance of a decision data structure for a predictive model trained using machine learning and configured to respond to the at least one query, the instance of the decision data structure being for the recipe;
predicting, by the data processing system, using the instance of the decision data structure, the at least one type of produce the author would use with the recipe;
determining, by the data processing system, a geographic origin of the produce and a transport time of the produce from the geographic origin to one or more sources from which the produce was procured;
analyzing the recipe, by the data processing system, against at least one ingredient available to the user, the at least one type of produce predicted for use by the author and one or more aspects of the produce, resulting in at least one analysis result;
modifying the recipe, by the data processing system, resulting in a modified recipe based on the geographic origin, the transport time and the at least one analysis result;
making available to the user, by the data processing system, the modified recipe;
monitoring, by the data processing system, the modified recipe to determine one or more modifications to the modified recipe; and
updating, using machine learning, the instance of the decision data structure based on the monitoring, wherein the monitoring and updating are performed, at least, periodically to provide an iteratively improved instance of the decision data structure to be used, at least in the predicting the at least one type of produce to improve the modifying the recipe.

17. The computer program product of claim 16, wherein the instantiating comprises instantiating a unique instance of the decision data structure for each recipe.

18. The computer program product of claim 16, wherein the analyzing comprises one or more of retrieving information, by the data processing system, regarding a type of the produce, retrieving information, by the data processing system, regarding any specific type of produce in the recipe and retrieving information, by the data processing system, regarding one or more characteristics of the produce, wherein the one or more characteristics comprises at least one of whether the produce is in season, whether the produce was ripened naturally, whether the produce was genetically modified and whether the produce is organic.

19. The computer program product of claim 16, wherein the modified recipe comprises one or more of a different amount of the produce than the recipe, a different amount of time for at least one step of the recipe and adding at least one ingredient to the recipe.

20. The computer program product of claim 16, further comprising using machine learning for the data processing system based on data regarding a plurality of produce and a plurality of recipes.

\* \* \* \* \*